United States Patent [19]
Solow et al.

[11] Patent Number: 6,071,615
[45] Date of Patent: Jun. 6, 2000

[54] PROTECTIVE COATING FOR WORKPIECES, ESPECIALLY OF CARBON COMPOSITE MATERIAL, WORKPIECES WITH A PROTECTIVE COATING OF THIS TYPE, AND PROCESS FOR PRODUCING SUCH PROTECTIVE COATING

[75] Inventors: Gerhard Solow, Kleinmachnow; Udo Wendt, Berlin; Ingo Hager, Berlin; Fred Gustav Wihsmann, Berlin, all of Germany

[73] Assignee: MAN Technologie Aktiengesellschaft, Karlsfeld, Germany

[21] Appl. No.: 08/845,761

[22] Filed: Apr. 18, 1997

[51] Int. Cl.⁷ ........................................ B32B 9/00
[52] U.S. Cl. .................. 428/408; 501/68; 501/69; 501/70; 427/201; 427/372.2; 427/375; 427/376.1; 427/376.2; 428/426; 428/697; 428/698; 428/701; 428/702; 428/704
[58] Field of Search ..................... 428/704, 697, 428/698, 699, 426, 432, 408, 701, 702; 427/201, 372.2, 375, 376.1, 376.2; 501/68, 69, 70, 32

[56] References Cited

U.S. PATENT DOCUMENTS

| | | | |
|---|---|---|---|
| 4,476,164 | 10/1984 | Veltri et al. | 428/408 |
| 4,585,675 | 4/1986 | Shuford | 428/408 |
| 4,795,677 | 1/1989 | Gray | 428/246 |
| 4,863,773 | 9/1989 | Rousseau et al. | 428/245 |
| 4,892,790 | 1/1990 | Gray . | |
| 4,894,286 | 1/1990 | Gray | 428/408 |
| 5,208,099 | 5/1993 | Maiwald-Hiller et al. | 428/306.1 |
| 5,209,950 | 5/1993 | Schwartz et al. | 427/252 |
| 5,298,311 | 3/1994 | Benson et al. | 428/216 |
| 5,310,476 | 5/1994 | Sekhar et al. | 205/230 |
| 5,330,838 | 7/1994 | Dyer et al. | 428/446 |
| 5,453,324 | 9/1995 | Shuford | 428/408 |
| 5,518,816 | 5/1996 | Shuford | 428/408 |

FOREIGN PATENT DOCUMENTS

| | | |
|---|---|---|
| 4443789 | 12/1994 | Germany . |
| 9320026 | 10/1993 | WIPO . |

*Primary Examiner*—Archene Turner
*Attorney, Agent, or Firm*—McAulay Nissen Goldberg Kiel & Hand, LLP

[57] ABSTRACT

A process is proposed for producing a protective layer on workpieces made, for example, from carbon composite material, for use at temperatures above 1000° C. In accordance with the invention, a comminuted solids mixture with refractory ceramic powder articles, e.g., of carbides, nitrides and/or silicides, preferably from groups III, IV and/or VIb of the periodic table, and with at least one compound of the general elemental composition $Me_xB_z$, where Me represents one of the elements Si, Al, Zr, Ti, Hf or Y, and x and z each represent a number from 1 to 6, and optionally, in addition, with at least one already formed glass with the following general oxidic composition: $Al_2O_3$—$B_2O_3$—$SiO_2$—RO, where RO represents MgO, CaO or BaO, is dispersed in a liquid carrier system, deposited on free surfaces of a workpiece, and heated together with the workpiece briefly with air access to a maximum temperature of 1200° C. The invention is further directed to a corresponding protective layer and to a workpiece with such a protective coating.

28 Claims, No Drawings

PROTECTIVE COATING FOR WORKPIECES, ESPECIALLY OF CARBON COMPOSITE MATERIAL, WORKPIECES WITH A PROTECTIVE COATING OF THIS TYPE, AND PROCESS FOR PRODUCING SUCH PROTECTIVE COATING

BACKGROUND OF THE INVENTION a) Field of the Invention

The present invention is directed to a protective layer or a protective coating for workpieces and to workpieces provided with such a protective coating, as well as to a process for producing a protective coating cn workpieces, wherein the workpieces in particular are made from carbon composite materials which are provided for use in a temperature range of approximately 500° C. to more than 1000° C., e.g., up to about 1600° C.

b) Description of the Related Art

Protective layers for improving oxidation stab lity, particularly of carbon-containing materials, are already known in the prior art as will be made clear by several examples hereinafter.

For a protective layer for graphite- and carbon-containing materials, including substrates with a reinforced carbon-carbon structure, at increased temperatures, U.S. Pat. No. 4,465,777 discloses a composition containing a solids particle mixture with 50 to 70 percent by weight silicon carbide, 25 to 40 percent by weight silicon, 1 to 15 percent by weight boron and a minimum amount of magnesium oxide. This minimum magnesium oxide content serves to facilitate layer formation. According to this process, heating of the substrate surrounded by the mixture to form a coating thereon in an inert atmosphere in a temperature range of 3075° F. (roughly 1698° C.) to 3350° F. (roughly 1851 ° C.) is claimed as sufficient.

An oxidation-resistant film for carbon-containing products, especially for crucible materials and casting-mold materials, is described in U.S. Pat. No. 4,559,270. The layer contains 20 to 70 percent by weight of mullite, 5 to 14 percent by weight of silica ($SiO_2$), 5 to 70 percent by weight of SiC and/or $B_4C$ and 5 to 14 percent by weight of a binder containing alkali silicate, ethyl silicate or colloidal $SiO_2$. Loading temperatures of 1350° C. are specified.

U.S. Pat. No. 4,535,035 describes an oxidation-resistant film for carbon-containing materials based on a mixture of nickel powder and silicon powder. The slurried mixture is sprayed onto a carbon-containing substrate and infiltrated into the pores of the substrate material by vacuum sintering in the range of 1200° C. to 1400° C.

A protective layer comprising a plurality of layers for carbon-containing materials is described in U.S. Pat. No. 4,471,023. The protective layer claimed therein is meant to be effective especially against cyclical thermal loading on carbon-containing substrates coated with a cover film of SiC. The base layer of the protective coating known from this reference is made from tetraethyl orthosilicate (TEOS) and serves for infiltration of the substrate. Another layer is formed of SiC particles in a liquid carrier system of alkali silicate; this layer is followed by a cover layer of alkali silicate without SiC particles. Finally, after application and drying of the various layers, a heat treatment is carried out at approximately 1800° F. (approximately 994° C.) in an inert atmosphere.

Finally, DE 40 34 001 A1 describes a coating for protecting against high-temperature oxidation of carbon-containing structural component parts. This coating is made from a powder mixture of $MoSi_2$ and a material component with a low melting point with respect to the latter such as an oxide glass, a nonoxide glass, glass-ceramics or a combination thereof. Roughly 10 to 50 percent by weight of the mixture consists of $MoSi_2$ particles which form a network which is fixedly embedded in the low-melting-point phase. Production of the protective layer is concluded by heating the workpiece coated with the powder mixture to 1300° C. to 1700° C. in air.

OBJECT AND SUMMARY OF THE INVENTION

Proceeding from these known protective layers and processes for production thereof, the present invention has the object of further improving the resistance of work materials, in particular carbon composite materials, to high-temperature oxidation using a protective coating which can be produced in a simple and dependable manner.

This object is met in accordance with the invention by a protective coating for a workpiece made from carbon composite material, with at least one protective layer is characterized in that it contains refractory ceramic powder particles with high emissivity for heat radiation and glassy-amorphous phases of the general type $Me_2O_3$—$MeO_2$—$B_2O_3$, where Me represents Si, Al, Zr, Ti, Hf or Y. The object is further realized according to the invention in a workpiece containing at least one protective layer. The invention further comprises a process for producing the protective coating and accordingly for producing the correspondingly coated workpiece wherein a comminuted solids mixture is dispersed in a liquid carrier system, deposited on the free surfaces of a workpiece, and heated together with the workpiece comprising the steps for producing a protective layer of preparing a comminuted solids mixture with refractory ceramic powder particles with high emissivity for heat radiation and at least one compound of the general elemental composition $Me_xB_z$, where x and z each represent a number from 1 to 6 and Me represents Si, Al, Zr, Ti, Hf or Y, is prepared and then dispersed in a liquid carrier system and subsequently deposited on free workpiece surfaces, and in that the subsequent heating of the solids mixture together with the workpiece is carried out briefly with air access to a maximum temperature of 1200° C.

The at least one protective layer of the protective coating according to the invention is preferably based on a solids mixture which is heated for its formation and which, for the purpose of forming glassy-amorphous phases of the general type $Me_2O_3$—$MeO_2$—$B_2O_3$, contains at least one compound having the general elemental composition $Me_xB_z$, where x and z each represents a number from 1 to 6 and Me represents Si, Al, Zr, Ti, Hf or Y. The at least one compound or compounds with the general elemental composition $Me_xB_z$ are advantageously and therefore preferably contained in the solids mixture in quantitative proportions of 4 to 25 percent by weight with reference to their total amount.

The production, in accordance with the invention, of the protective coating of a workpiece, in particular of carbon composite material, wherein a comminuted solids mixture is dispersed in a liquid carrier system, deposited on free workpiece surfaces and heated together with the workpiece, is characterized in that a comminuted solids mixture with refractory ceramic powder particles with high emissivity for heat radiation and at least one compound of the general elemental composition $Me_xB_z$, where x and z each represent a number from 1 to 6 and Me represents Si, Al, Zr, Ti, Hf or Y, is prepared and then dispersed in a liquid carrier system and subsequently deposited on free workpiece surfaces, and in that the following heating of the solids mixture together with the workpiece is effected with air access briefly to a maximum temperature of 1200° C.

In contrast to the solutions in the prior art, the solution according to the present invention is distinguished particularly in that a continuously thermoviscous material, i.e., a material which is always characterized by plastic behavior, based on a matrix-dispersing agent composite system is obtained as protective layer or protective coating in the entire relevant temperature range between the beginning oxidation temperature of the carbon materials greater than 500° C. and, e.g., a given maximum operating temperature of approximately 1600° C. This advantageous effect of the protective layer according to the invention is made possible in that the comminuted solids mixture contains only the two above-mentioned components, wherein the refractory ceramic powder particles form the dispersing agent component and accordingly the mechanical-thermal stabilizing structure of the protective layer and the $Me_xB_z$ compound form the thermoviscous matrix component which functions as in-situ binding phase for the stabilizing structure of ceramic particles.

Surprisingly, it has been found that the $Me_xB_z$ compounds, where Me represents the elements Si, Al, Zr, Ti, Hf or Y, when heated briefly accompanied by air access to a maximum temperature of 1200° C., develop, as a result of partial oxidation, an increased reactiveness to the formation of glassy-amorphous phases of the general type $Me_2O_3$—$MeO_2$—$B_2O_3$ which is advantageously suited as in-situ binding phase of the protective coating according to the invention. The glassy-amorphous compounds are distinguished by minimum susceptibility to crystallization, by chemical and thermal stability and by considerable diffusion stability relative to penetrating oxygen.

As a result of the present invention, protective layers or protective coatings can be determined and produced which enable an external oxidation protection of proven quality in an operating range which is extended, e.g., to approximately 1600° C. under special conditions according to application tolerances such as cyclically occurring thermal loading, climatic prestressing of the layers or coatings with subsequent static and/or cyclical oxidation, thermomechanical loading by hot-gas flowing against the layers, etc.

Further, the viscous-plastic behavior of the glassy-amorphous compounds within the entire relevant operating temperature range of the carbon composite materials enables a synergistic effect, within the meaning of the solution according to the invention, due to an additional outer sealing of cracks which frequently occur on the surfaces of carbon composite materials as a result of the thermal expansion mismatch of the material components, e.g., especially when the material surface has been provided with a SiC sealing coat. This prevents direct oxidative attack by oxygen via surface cracks on carbon-containing components in the interior of the composite material.

Although this is not absolutely necessary for successfully achieving the protective coating according to the invention, the usable solids mixture optionally contains, in addition to the two components mentioned above, at least one already formed glass with the following general oxidic composition: $Al_2O_3$—$B_2O_3$—$SiO_2$—RO, where RO represents MgO, CaO and/or BaO, which glass is a priori resistant to crystallization or, in other words, not capable of crystallization. This glass which is a priori resistant to crystallization is preferably composed of the following oxidic components: 2 to 25 percent by weight $Al_2O_3$, 20 to 32 percent by weight $B_2O_3$, 40 to 68 percent by weight $SiO_2$, 0 to 8 percent by weight MgO, 0 to 10 percent by weight CaO and 0 to 5 percent by weight BaO and is already contained, preformed, in a solids mixture forming the basis of the protective layer in quantitative proportions of up to 40% with respect to the total amount of solids mixture. According to the process, the corresponding solids mixture is then dispersed in a liquid carrier system, deposited on the free surfaces of a workpiece, e.g., of carbon composite material, and briefly heated together with the workpiece with air access to a maximum temperature of 1200° C.

The addition of an already formed glass of the type described above represents a further development of the invention with respect to the control of the thermoviscous behavior of the layer according to the invention, particularly as concerns the property of resistance to crystallization and the stable viscosity behavior which is necessitated by the latter, and has proven especially advantageous when certain mechanical-thermal loading occurs in the temperature range of up to 1600° C., e.g., an additional contact pressure due to a gas flowing at ultrasonic velocity against the layer, which necessitates high layer adhesion.

Another preferable characteristic of the invention consists in that the solids mixtures according to the invention which are dispersed in a liquid carrier system can be deposited in multiple successive layers on the free surfaces of a workpiece made from carbon composite material, wherein the solids mixtures contained in the individual layers can also be structured differently with respect to the type and quantitative proportions of the components according to the invention contained therein. In this way, coating layers can realized with selectable characteristic gradients over the layer thickness.

In accordance with the process, the additional layers of the coating according to the invention are deposited, in particular, before the brief heating of the solids mixture together with the workpiece with access to air to a maximum temperature of 1200° C., i.e., a plurality of layers are first applied and then, where appropriate, dried, and only then is the entire coating heated as a whole. Alternatively, it is also possible to heat, in the manner according to the invention, each protective layer individually immediately after it has finished being applied.

In accordance with a preferred further development of the invention, refractory ceramic powder particles of carbides, nitrides and/or silicides, especially from groups III, IV and/or VIb of the periodic table, are used for the protective coating. Further, apart from or in combination with the development mentioned above, the refractory ceramic powder particles can advantageously have an emissivity for heat radiation of at least 0.70. In another advantageous development which can be combined with the developments mentioned above, the solids mixture upon which the protective layer is based for its formation contains the refractory ceramic powder particles in quantitative proportions of 40 to 88 percent by weight with reference to the total weight of the solids mixture.

Another advantageous development of the invention consists in that at least 80 percent by weight, but preferably at least 90 percent by weight, of all components of the solids mixture upon which the protective layer or protective layers are based have equivalent diameters of less than 10 micrometers.

It is further advantageous for the process according to the invention that the liquid carrier system contains organic solvents, preferably lower alcohols, ketones, esters and cycloaliphatics. In this connection, it is particularly preferable that the liquid carrier system contains solutions of macromolecular film-forming compounds, preferably based on cellulose and derivatives thereof, in organic solvents.

In another advantageous development of the process, 0.5 to 80 parts by volume of the solids mixture are dispersed in 100 parts by volume of the liquid carrier system.

Further, in order to obtain a particularly effective protective layer, it is advantageous and therefore preferable that the heating of the workpiece which is coated with the solids mixture is effected in the claimed process at a heating rate of at least 50 K min$^{-1}$, preferably at least 100 K min$^{-1}$.

Further advantageous developments of the invention follow from the respective dependent claims individually and in combination.

In the following, the invention will be explained more fully with reference to a number of embodiment examples. However, the selected examples in no way represent limitations of the further design possibilities of the inventive idea, whose scope is determined by the claims and the corresponding statements contained in this description.

DESCRIPTION OF THE PREFERRED EMBODIMENTS

EMBODIMENT EXAMPLES

Example 1

A comminuted solids mixture which is dispersed in a liquid carrier system and which is composed of 75–86 parts by weight $MoSi_2$;

6.5–10 parts by weight $B_4C$;

7–12 parts by weight $SiB_4$; and

2–6 parts by weight $YB_6$ was applied to the free surface of a test piece made of carbon composite material by painting, spraying or dipping, depending on the respective volume percent of the solids mixture dispersed in the liquid carrier system, and dried at temperatures between 100 and 140° C.

This process was repeated several times, when necessary, depending on the desired layer thickness of the coat, wherein interim drying was advantageously carried out after every application. The coated sample piece was heated to a temperature of 1200° C. within a period of 5 minutes and held at this temperature for at least 15 minutes.

A series of test pieces which were sealed in the described manner was subsequently subjected to a cyclical loading test in dead air as follows: Heating within a period of 7 minutes from room temperature to 1600° C., holding time at 1600° C. for 2 minutes, and cooling from 1600° C. to room temperature within a period of 15 minutes. After the test pieces had run through a total of 20 cycles of this loading test, a weight loss below the permissible limit of <2% caused by melting loss or burnup was determined. The residual tensile strength values determined in these test pieces were between 80 and 90% of the original material strength before the thermal cycling.

Example 2

The process described in Example 1 was carried out, with the exception that the comminuted solids mixture dispersed in a liquid carrier system contained:

44–53 parts by weight $Si_3N_4$;

26–33 parts by weight SiC;

7–12 parts by weight $SiB_4$;

3–6 parts by weight $ZrB_2$; and

6–15 parts by weight $B_4C$ and the coated sample piece was heated to a temperature of 1100° C. within a period of 5 minutes and held at this temperature for at least 20 minutes.

In a subsequent static oxidation test carried out in dead air, the sealed sample piece satisfied the criterion of permissible weight loss by burnup of <2% with reference to the weight of the sample piece after a treatment period of 3 hours at a temperature of 1600° C.

Example 3

A workpiece of carbon composite material was coated with a combination protective layer comprising a base layer and a cover layer, each with a different composition and different quantitative proportions of the components according to the invention of the solids mixtures, in the manner indicated in Example 1.

To produce the base layer, the workpiece was heated to a temperature of 1050° C. within a period of 7 minutes and held at this temperature for 10 minutes after application of a solids mixture comprising 50 to 60 parts by weight SiC, 4 to 10 parts by weight $HfB_2$ and 33 to 43 parts by weight of an already formed glass of the following oxidic composition: 1 to 4 percent by weight BaO, 2 to 5 percent by weight $Al_2O_3$, 25 to 32 percent by weight $B_2O_3$ and 63 to 68 percent by weight $SiO_2$.

After cooling the workpiece, the coating was repeated with a cover layer comprising a solids mixture of the following composition: 52 to 58 parts by weight $MoSi_2$, 1 to 3 parts by weight $B_4C$, 3 to 8 parts by weight $ZrB_2$ and 35 to 43 parts by weight of an already formed glass of the following oxidic composition: 17 to 22 percent by weight $Al_2O_3$, 25 to 32 percent by weight $B_2O_3$, and 43 to 50 percent by weight $SiO_2$. The workpiece provided with the cover layer was heated to a temperature of 1200° C. in 10 minutes and held at this temperature for 15 minutes.

The workpiece which was sealed with a combination protective layer in the manner described above was characterized in particular by high shear resistance of the layer relative to high-speed gas flows in the ultrasonic range at ambient temperatures of 1600° C. After 10 gas inflow cycles of 3 minutes each at 1600° C., residual strengths in excess of 90% were determined in comparison to the original material strength.

Example 4

A workpiece made from carbon composite material was provided with a multiple-layer protective coating as described in Example 3, with the exception that 4 layers, each with different compositions of solids mixtures were applied one after the other to the free surface of the workpiece using different layer application techniques:

First, 0.5 to 12 parts by weight of a solids mixture according to the invention formed of 85 percent by weight SiC and 15 percent by weight $SiB_4$ were dispersed in 100 parts by weight of a liquid carrier system formed of an organic solvent suitable as a dispersing agent. After infiltration of the free workpiece surfaces with this dispersion, interim drying, and subsequent sealing by means of heating to 1200° C. within a period of 5 minutes, and a holding period of 10 minutes at this temperature, three additional layers were applied to the free surfaces of the workpiece by painting or spraying using higher quantitative proportions of the solids mixtures according to the invention in the liquid carrier systems which are preferably formed in this case from solutions of macromolecular film-forming compounds. The solids mixture of the additional layers according to the invention were composed as follows, in order of application, (percent by weight):

2nd layer: 51–60 SiC, 25–32 $MoSi_2$, 3–6 $B_4C$, 7 to 11 $SiB_4$,
3rd layer: 23–30 SiC, 53–61 $MoSi_2$, 3–6 $B_4C$, 7 to 11 $SiB_4$, and
4th layer: 83–87 $MoSi_2$, 6–10 $B_4C$, 4 to 7 $SiB_4$.

After interim drying of the respective layer applications, the entirety was sealed by heating the coated workpiece to a temperature of 1200° C. within a period of 10 minutes and subsequently holding the workpiece at this temperature for 30 minutes. The process illustrated in this example is particularly suitable for sealing a material surface which is not coated by an additional CVD-SiC sealing coat.

A series of test pieces sealed in the described manner was subsequently subjected to a combined moisture/heat loading (200 hours at 75° C. and 95% relative humidity) in a climatic chamber.

Static oxidation tests in dead air which were conducted with the test pieces loaded in the described manner showed burnup losses of less than 2% with respect to the starting weight of the test piece after a loading period of 3 hours for loading temperatures of 700° C. and 1600° C.

In conclusion, in accordance with one embodiment form, a process is suggested for producing a protective layer on workpieces, e.g., formed of carbon composite material, for use in a temperature range of greater than 1000° C. According to the invention, a comminuted solids mixture with refractory ceramic powder particles of, e.g., carbides, nitrides and/or silicides from groups III, IV and/or VIb of the periodic table and at least one compound with the general elemental composition $Me_xB_z$, where Me represents one of the elements Si, Al, Zr, Ti, Hf or Y, and x and z each represent a number from 1 to 6, and optionally, in addition, at least one already formed glass of the general oxidic composition $Al_2O_3$—$B_2O_3$—$SiO_2$—RO, where RO represents MgO, CaO or BaO, is dispersed in a liquid carrier system, deposited on free surfaces of a workpiece, and briefly heated together with the workpiece with access to air to a maximum temperature of 1200° C. In this way, a workpiece with a protective coating of this kind is also provided each time a corresponding protective layer is carried out.

What is claimed is:

1. A protective coating for a workpiece, in particular for a workpiece made from carbon composite material, with at least one protective layer, comprising that the protective layer contains refractory ceramic powder particles with high emissivity for heat radiation and glassy-amorphous phases of the general type $Me_2O_3$—$MeO_2$—$B_2O_3$, where Me is selected from the group consisting of Si, Al, Zr, Ti, Hf and Y and at least one already formed glass with the following general oxidic composition $Al_2O_3$—$B_2O_3$—$SiO_2$—RO, where RO is selected from the group consisting of Mgo, Cao and BaO, which glass is a prior resistant of crystallization and the protective layer is based on a solids mixture which is heated for its formation and which, for the purpose of forming said glassy-amorphous phases contains at least one compound having the general elemental composition $Me_xB_z$, where x and Z each represent a number from 1 to 6, and Me is selected from the group consisting of Si, Al, Zr, Ti, Ht and Y.

2. The protective coating according to claim 1, wherein the refractory ceramic powder particles are carbides, nitrides and/or suicides.

3. The protective coating according to claim 2, wherein the carbides, nitrides and/or silicides are selected from groups III, IV and/or VIb of the periodic table.

4. The protective coating according to claim 1, wherein the refractory ceramic powder particles have an emissivity for heat radiation of at least 0.70.

5. The protective coating according to claim 1, wherein the protective layer is based on a solids mixture heated for its formation, which solids mixture contains the refractory ceramic powder particles in quantitative proportions of 40 to 88 percent by weight with reference to the total weight of the solids mixture.

6. The protective coating according to claim 5, wherein at least eighty percent by weight of all components of the solids mixture have equivalent diameters of less than 10 micrometers.

7. The protective coating according to claim 5, wherein at least ninety percent by weight of all components of the solids mixture have equivalent diameters of less than 10 micrometers.

8. The protective coating according to claim 1, wherein the compound with the general elemental composition $Me_xB_z$ is contained in the solids mixture in quantitative proportions of 4 to 25 percent by weight with reference to the total amount.

9. The protective coating according to claim 1, wherein the protective layer is based on a solids mixture which is heated for its formation and which contains the glass of the general oxidic composition $Al_2O_3$—$B_2O_3$—$SiO_2$—RO, which is a priori resistant to crystallization and has the following oxidic components: 2 to 25 percent by weight $Al_2O_3$, 20 to 32 percent by weight $B_2O_3$, 40 to 68 percent by weight $SiO_2$, 0 to 8 percent by weight MgO, 0 to 10 percent by weight CaO and 0 to 5 percent by weight BaO and is already contained, pre-formed, in quantitative proportions of up to 40% with respect to the total amount of solids mixture.

10. A workpiece, especially of carbon composite material, comprising a protective coating according to claim 1 and having at least one protective layer.

11. The workpiece according to claim 10, wherein the protective coating contains multiple successive protective layers which are based on solids mixtures which have different compositions with respect to the type and quantitative proportions of the components contained therein.

12. A process for coating a workpiece, especially of a carbon composite material, with a protective coating, wherein a comminuted solids mixture is dispersed in a liquid carrier system, deposited on the free surfaces of a workpiece, and heated together with the workpiece, comprising the steps for producing a protective layer of:

preparing a comminuted solids mixture with refractory ceramic powder particles with high emissivity for heat radiation and at least one compound of the general elemental composition $Me_xB_z$, where x and z each represent a number from 1 to 6 and Me is selected from Si, Al, Zr, Ti, Hf and Y;

then dispersing said mixture in a liquid carrier system; and subsequently depositing the dispersed mixture on free workpiece surfaces; and wherein the process further comprises the step of carrying out subsequent heating of the solids mixture together with the workpiece briefly with air access to a maximum temperature of 1200° C.

13. The process according to claim 12, wherein the refractory ceramic powder particles in the comminuted solids mixture are carbides, nitrides and/or silicides.

14. The process according to claim 13, wherein said carbides, nitrides and/or silicides are selected from groups III, IV and/or VIb of the periodic table.

15. The process according to claim 12, wherein the refractory ceramic powder particles in the comminuted solids mixture have an emissivity for heat radiation of at least 0.70.

16. The process according to claim 12, wherein the refractory ceramic powder particles in the comminuted solids mixture are contained in quantitative proportions of 40 to 88 percent by weight with reference to the total weight of the solids mixture.

17. The process according to claim 12, wherein at least one compound or compounds with the general elemental composition $Me_xB_z$ is/are contained in the comminuted solids mixture in quantitative proportions of 4 to 25 percent by weight with reference to the total amount of the solids mixture.

18. The process according to claim 12, wherein the comminuted solids mixture contains, in addition, at least one already formed glass with the following general oxidic composition: $Al_2O_3$—$B_2O_3$—$SiO_2$—RO, where RO is selected from the group consisting of MgO, CaO and BaO, which glass is a priori incapable of crystallization.

19. The process according to claim 18, wherein the solids mixture, with reference to its total amount, contains the glass of the general oxidic composition $Al_2O_3$—$B_2O_3$—$SiO_2$—RO, which is a priori resistant to crystallization and has the following oxidic components: 2 to 25 percent by weight $Al_2O_3$, 20 to 32 percent by weight $B_2O_3$, 40 to 68 percent by weight $SiO_2$, 0 to 8 percent by weight MgO, 0 to 10 percent by weight CaO and 0 to 5 percent by weight BaO and is already contained, pre-formed, in quantitative proportions of up to 40% with respect to the total amount of solids mixture.

20. The process according to claim 12, wherein at least 80 percent by weight of all components of the comminuted solids mixture have equivalent diameters of less than 10 micrometers.

21. The process according to claim 12, wherein at least 90 percent by weight of all components of the comminuted solids mixture have equivalent diameters of less than 10 micrometers.

22. The process according to claim 12, wherein the liquid carrier system contains organic solvents, preferably lower alcohols, ketones, esters and cycloaliphatics.

23. The process according to claim 20, wherein the liquid carrier system contains solutions of macromolecular film-forming compounds, based on cellulose and derivatives thereof, in organic solvents.

24. The process according to claim 12, wherein 0.5 to 80 parts by volume of the solids mixture are dispersed in 100 parts by volume of the liquid carrier system.

25. The process according to claim 12, wherein the heating of the workpiece which is coated with the solids mixture is effected at a heating rate of at least 50 K $min^{-1}$.

26. The process according to claim 12, wherein the heating of the workpiece which is coated with the solids mixture is effected at a heating rate of at least 100 K $min^{-1}$.

27. The process according to claim 12, wherein solids mixtures, each of which is dispersed in a liquid carrier system, are deposited in multiple successive protective layers on free surfaces of the workpiece, especially before heating the solids mixture together with the workpiece briefly to a maximum temperature of 1200° C. with air access.

28. The process according to claim 27, wherein the solids mixtures forming the basis of the individual protective layers have different compositions with respect to the type and quantitative proportions of the components contained therein.

* * * * *